United States Patent [19]

Harth et al.

[11] Patent Number: 4,912,624

[45] Date of Patent: Mar. 27, 1990

[54] MULTI-PARAMETER OPTIMIZATION CIRCUIT

[75] Inventors: Erich Harth, Jamesville; Theodore Kalogeropoulos, Syracuse, both of N.Y.

[73] Assignee: Syracuse University, Syracuse, N.Y.

[21] Appl. No.: 175,395

[22] Filed: Mar. 30, 1988

[51] Int. Cl.⁴ .............................................. G05B 13/02
[52] U.S. Cl. .................................................... 364/156
[58] Field of Search ................................. 364/152–156; 318/610

[56] References Cited

U.S. PATENT DOCUMENTS

| | | | |
|---|---|---|---|
| 3,460,096 | 8/1969 | Barron | 340/172.5 |
| 3,519,998 | 7/1970 | Barron | 340/172.5 |
| 3,617,717 | 1/1971 | Smith | 235/151.1 |
| 4,096,562 | 6/1978 | Linz | 318/632 |
| 4,163,279 | 7/1979 | Kubota | 318/610 |
| 4,175,283 | 11/1979 | Buchwald et al. | 318/610 |
| 4,232,364 | 11/1980 | Bibbero | 318/561 |
| 4,358,822 | 11/1982 | Sanchez | 364/151 |
| 4,509,110 | 4/1985 | Levesque, Jr. et al. | 364/153 |

Primary Examiner—Allen MacDonald
Attorney, Agent, or Firm—Wall and Roehrig

[57] ABSTRACT

A multi-parameter control circuit supplies a number of control signals to a multiple-input system, and these regulate process parameters. A cost function, which depends on all of the parameters, is measured, and a time derivative signal is produced which represents the time differential of the cost function. There are a number of control signal circuits responsive to the cost function derivative which each include a multiplier that receives the time derivative signal, and a second input. An integrator integrates the output of the multiplier and provides a time integral to one input of an adder, a second input of which is provided with a rapidly varying incoherent signal, which can be white noise. The adder produces a parameter control output signal which is used to control the process parameter. A differentiator has an input connected to the adder output and an output that provides a time derivative of the parameter control signal to the second input of the multiplier. Alternatively, a single digital circuit may be used in a multiplexing mode to represent in succession all control signal circuits.

9 Claims, 4 Drawing Sheets

1 MSEC

MULTI-PARAMETER OPTIMIZATION CIRCUIT

BACKGROUND OF THE INVENTION

This invention relates to electronic devices capable of maximizing or minimizing a value which is a function of a number of parameters, and what is generically referred to as "cost function". The invention is more particularly directed to a multiple parameter control circuit capable of simultaneously adjusting controlled input variables for maximizing or minimizing a particular performance criterion, for example, in an industrial process.

In a typical industrial system, such as a machine, power plant, or the like, the operation generates a so-called "cost function", for example, power, efficiency, fuel economy, safety, etc. The cost function, in turn, is a function of a number of controlled parameters, such as fuel feed rate, combustion air pressure and temperature, exhaust damper settings, etc. Each of these parameters may be adjusted independently of the others, but the optimum value of the cost function will require optimal setting of all of the various parameters.

Cost functions, which can be optimized in terms of the setting of a multiplicity of input parameters, can also come about in computational problem solving, such as curve fitting, maximum likelihood calculations, polynomial expansions, and the like. Cost functions are also used in computer simulations, such as the determination of optimal designs in engineering, scheduling problems, many-body particle interactions, crystal growth problems, and other problems of physics and the sciences.

An orthogonal modulation technique for optimizing control systems has been described in U.S. Pat. No. 3,617,717. In that technique, a number of control signals result from multiplying a performance indicating signal by respective modulation signals, and the result is integrated and sampled. However, this technique is rather complex and so requires complex circuitry. In particular, a digital computer is required to carry out a large number of iterative calculations. The procedure is rather time consuming, which means that the cost function will not always converge quickly to an optimal value. That system can control only a small number of parameters. The correlation between feedback and cost function is weak, and convergence is slow.

OBJECTS AND SUMMARY OF THE INVENTION

Accordingly, it is an object of this invention to provide a multi-parameter control circuit which rapidly and continuously controls a set of control parameters so as to optimize a cost function, which is either a linear or non-linear function, as the case may be, of the several parameters.

It is another object of this invention to provide an analog circuit which quickly and efficiently optimizes the cost function.

It is yet another object of this invention to provide the multi-parameter control circuit as an array of modules which can be integrated onto a single IC chip.

In accordance with an aspect of this invention, the multi-parameter control circuit supplies a plurality of control signals to a multiple-input circuit. The latter regulates various parameters which drive a process, and a cost function is evaluated. The cost function can be any of a number of process measures, such as power, efficiency, quality, speed, safety, etc. A time-derivative signal is produced representing the time derivative (i.e., time rate of change) of the cost function. In the multi-parameter control circuit there are a plurality of control signal generating circuits which respectively provide control signals to the multiple input circuit which, in turn, controls the respective input parameters. These control signal generating circuits automatically adjust their associated control signals so as to optimize the cost function. In each of the control signal generating circuits there is a multiplier that has a first input coupled to receive the time derivative signal, a second input, and an output. An integrator has an input coupled to the output of the multiplier and an output that provides a time integral of the output of the multiplier. An adder circuit has a first input coupled to the output of the integrator, a second input, and an output that provides the associated control signal. A noise signal generator or other perturbation signal generator provides an electrical perturbation to the second input of the adder. A differentiator circuit has an input connected to the adder and an output that provides a time derivative of the associated control signal to the second input of the multiplier. The multi-parameter control circuit provides the respective control signals according to the relation $$Y_i(t) = Y_1(0) + g_i(t) + \gamma \int \dot{F}(t) \cdot \dot{Y}_i(t) dt$$

where:
$Y_i(t)$ is the associated control signal, $Y_i(0)$ is the initial value of the control signal,
$g_i(t)$ is the noise or perturbation,
$\dot{F}(t)$ is the time derivative of the cost function F(t)
$\dot{Y}_i(t)$ is the time derivative of the associated control signal, and
$\gamma$ is a constant, which is positive
where
F(t) is to be maximized and negative
where
F(t) is to be minimized.

The above relationship results in optimization of the cost function F(t) in a continuous mode. The control circuit ultimately hunts out those values of $Y_i(t)$ which yield F(t)=0. The stochastic character of the relationship will tend to seek global, rather than local extreme values for the cost function.

The above and many other objects, features and advantages of this invention will be more fully understood from the ensuing description of a preferred embodiment, which is to be read in connection with the accompanying drawing.

DETAILED DESCRIPTION OF A PREFERRED EMBODIMENT

Figure 1:
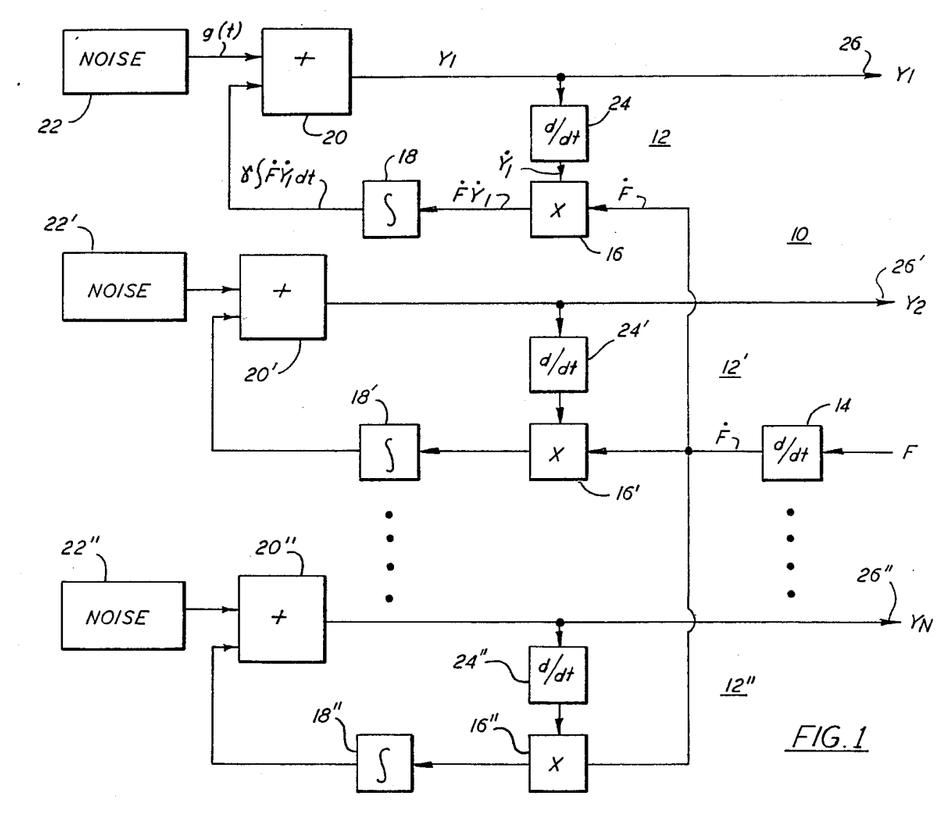
FIG. 1 is a schematic circuit diagram of a multi-parameter control circuit according to a preferred embodiment of this invention.

With reference to the drawing, and initially to FIG. 1 thereof, a multi-parameter control circuit 10 is formed of a number of control signal generating circuits 12, 12', 12''. These control signal generating circuits are substantially identical, and similar elements in each are identified with the same reference numbers, but primed or double primed in the case of circuits 12' and 12''. While three circuits 12, 12', and 12'' are shown, it is understood that the number thereof is not limited.

A cost function F is produced, for example, in a process control computer (not shown) and provides a convenient measure of a quantity to be optimized (i.e., minimized or maximized). This can be a process output measurement, such as power, efficiency, cost-per-unit, quantity, or any other desired measure. The process itself is a function of a number of control variables, which can, for example, be fuel flow rate, fuel temperature, combustion gas pressure, combustion gas temperature, exhaust damper setting, etc. A time derivative $\dot{F}$ is generated either by the process control computer or by a suitable differentiator circuit 14 as a differential signal value, or time rate of change. This signal $\dot{F}$ is supplied to one input of a multiplier 16, another input of which is fed with an output differential signal $\dot{Y}_i$.

Following the multiplier 16, an integrator 18 integrates the product of the signals $\dot{F}$ and $\dot{Y}_i$ over time, and multiplies the resulting integral by a factor $\gamma$ which is negative if it is desired to minimize the cost function F or positive if it is desired to maximize the cost function. The output of the integrator circuit 18 is fed to an input of an adder circuit 20. Here, the integrator output signal is combined with an electrical perturbance g(t), which can, for example, be a noise signal generated by a white noise generator 22. The adder 20 has an output which provides an output control signal $Y_i$ that is supplied to a differentiator circuit 24. The latter provides a time derivative signal $\dot{Y}_i$ to the second input of the multiplier 16. The control signal $Y_i$ is also supplied to an output 26, and thence to a process control circuit, for example.

Each of the control signal circuits 12, 12'and 12'' has an independent white noise generator 22, 22', and 22''. In this fashion, the signals g(t) supplied to the adders 20, 20' and 20'' are mutually incoherent, so that the output control signals $Y_1, Y_2, \ldots Y_n$ are perturbed independently.

Figure 2:
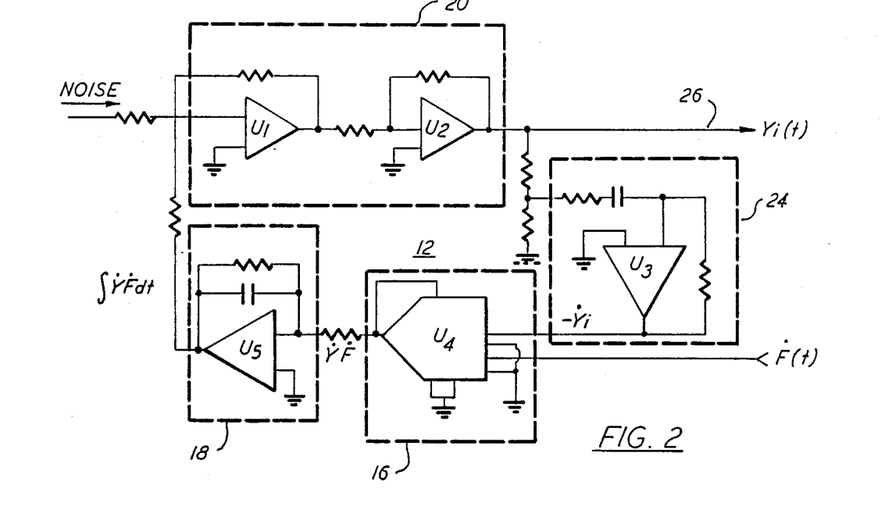
FIG. 2 is one possible circuit realization of a portion of the control circuit of FIG. 1.

A multi-parameter control circuit according to this invention can be realized by employing a number of control signal generating circuits 12 as shown generally in FIG. 2. In one practical embodiment, the adder 20 is formed of a pair of type LF-355 op amps, while the differentiator 24 and the integrator 18 are each formed of single LF-355 op amps. The multiplier 16 is formed of an AD-532 multiplier.

The noise generator 22 can be any suitable source of fluctuating, preferably incoherent rapid voltage variations, and in one mode can be constituted by a National Semiconductor MM5437 noise generator. In this type of noise generator, Gaussian noise is produced as the signal g(t).

In a practical test an electronic circuit was constructed to supply a cost function in response to three control signals $Y_1$ $Y_2$, and $Y_3$. The cost function F was computed in that circuit as the sum of the squares of the differences between the values of the control signals and three 'target' values $A_1$, $A_2$, and $A_3$. Thus, $$F = (A_1 - Y_1)^2 + (A_2 - Y_2)^2 + (A_3 - Y_3)^2.$$

Figure 5A:
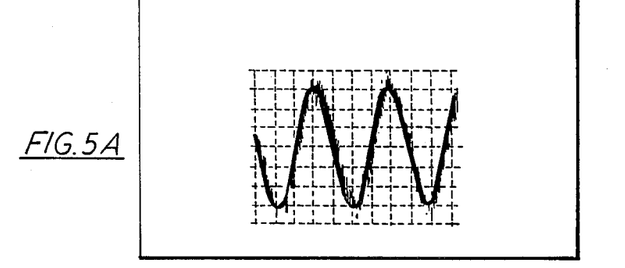
FIGS. 5A, 5B, and 5C are traces of cost function changes to show convergence to optimum for a circuit according to this invention.
Figure 5B:
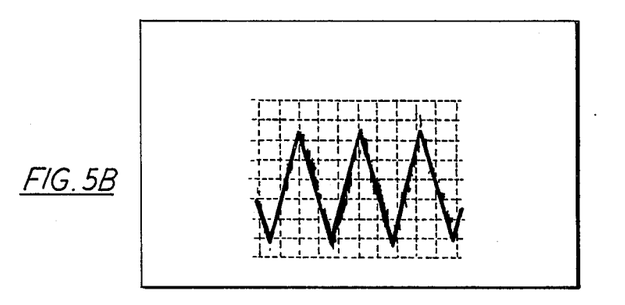
Figure 5C:
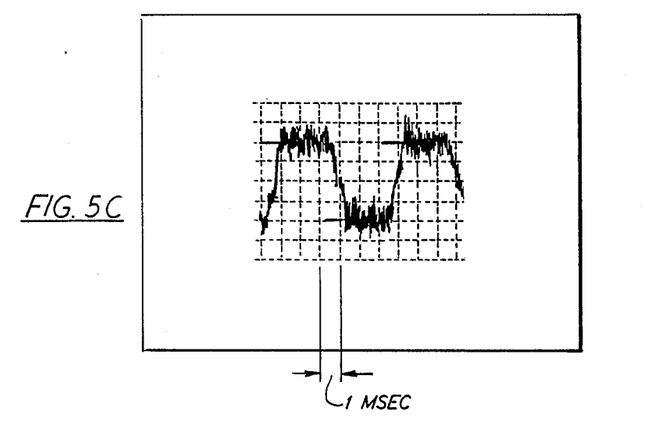

With the constant $\gamma$ set to (−1) to minimize F, with the values $A_1$, $A_2$, and $A_3$ arbitrarily chosen, and with initial values $Y_i(0)$, $Y_2(0)$, and $Y_3(0)$ all being zero, a three-parameter control circuit caused the control signals to rapidly approach their target values $A_1$, $A_2$, and $A_3$ respectively. In order to study the dynamic characteristics of the device, we 'strobed' the target values $A_1$, $A_2$, and $A_3$ simultaneously but incoherently at rates up to several hundred hertz. FIGS. 5 A, B, and C show the periodic changes in $A_1$, $A_2$, and $A_3$ (smooth traces) as sinusoidal, sawtooth and square wave, respectively. The tracking of the control signals is shown as superimposed jagged traces. It is seen that only in the case of the abrupt changes in $A_3$ (square wave) is there a noticeable delay of about one millisecond.

The level of the noise or other perturbation signal g(t) should be of sufficient amplitude and frequency so that the time derivative signals $\dot{Y}(t)$ and $\dot{F}(t)$ are sufficiently great to provide adequate feedback. However, when optimal operation is achieved and no further changes in the cost function occur, the noise may be gradually reduced to zero to obtain smooth operation.

Figure 3:
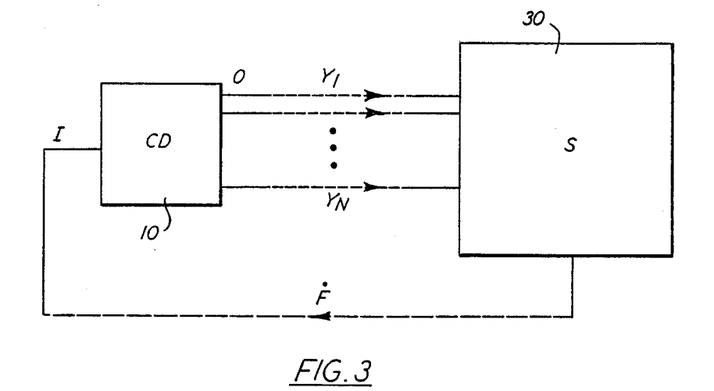
FIG. 3 is a schematic diagram showing the multi-parameter control circuit of this invention in combination with a process control circuit.

In a practical form of the multi-parameter control circuit 10, the entire device would preferably be formed on a single chip providing a plurality of Y(t) outputs, and requiring only a power supply, a ground, an $\dot{F}(t)$ input I. As shown in FIG. 3, its input I would comprise a single line that carries the time derivative signal $\dot{F}$ of the cost function F. The output lines O carry the control parameters Y(t) to a process control circuit 30 which adjusts the process values and calculates the cost function F and its derivative $\dot{F}$. The system circuit 30 may represent any arbitrary system, for example, a power plant, which requires a number of control parameters $Y_1 \ldots Y_n$. As an alternative, the system circuit 30 can also represent an analog circuit for simulating the design of a particular device such as an airplane wing, or a process such as a scheduling or queuing, whose overall performance characteristic would be the cost function F and would depend on a number of input parameters.

In monitoring the system, the control circuit 10 observes only a single cost function F, for example, the efficiency with which the system circuit 30 performs its task. To optimize the value of the function F, the derivative $\dot{F}$ of the cost function is fed to the control device 10, which dynamically adjusts the N control parameters $Y_1$ through $Y_n$.

Figure 4:
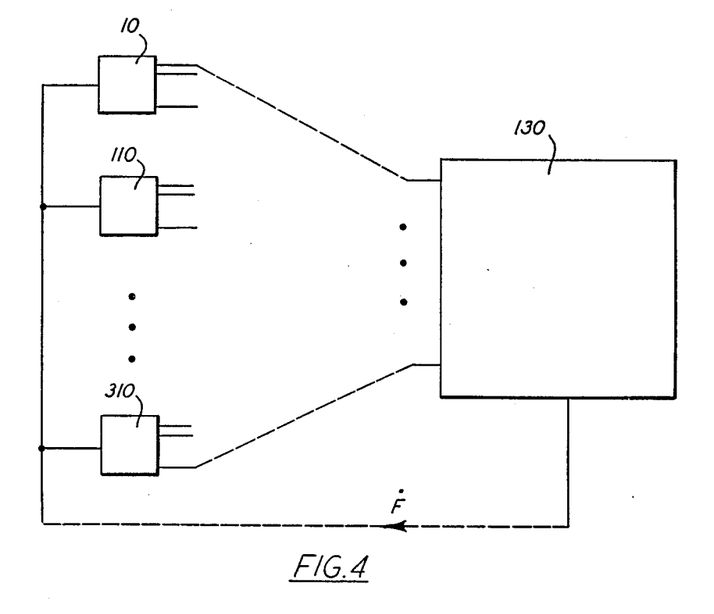
FIG. 4 is a schematic diagram illustrating the arrangement of a multiplicity of the multi-parameter control circuits of this invention supplying a multiplicity of control inputs to a process control circuit.

In FIG. 3, a single integrated circuit containing N control signal circuits 12 performs all the necessary control functions on the system circuit 30. On the other hand, in the case of a very large system, 130, as shown in FIG. 4, where a large number of control parameters are employed, several of the control devices 10, 10', etc. may be stacked, all receiving the same input $\dot{F}$.

The speed of convergence of this control device is directly related to the frequency components of the perturbing signals g(t), the speed of the responding system, and the number N of control parameters $Y_n$ that determine the cost function F.

In a single three-module system, with a noise signal g(t) with a band width of 1 MHz, convergence to an optimal value of the cost function F was achieved in less than one millisecond.

In a possible digital realization of this circuit, parallel computation may be achieved by scanning of a number N parameters sequentially. A single control signal circuit could operate on a time-sharing basis. This would consume only a few milliseconds. With a digital circuit realization, a single circuit could assume the functions of the many modules, and digital construction would also simplify the design of the device as a single integrated chip.

Figure 6:
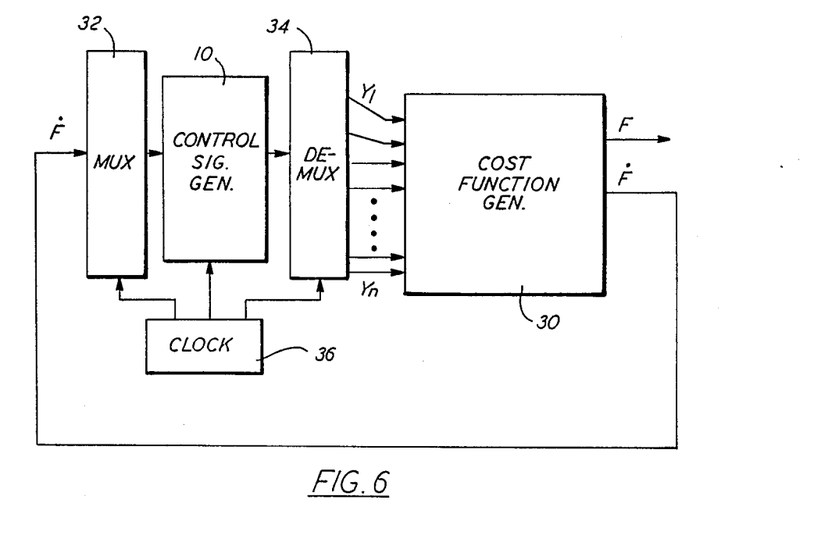
FIG. 6 is a schematic circuit block diagram of an alternative embodiment.

A digital realization could appear as the circuit shown in FIG. 6. Here the cost function generating circuit 30 provides the time derivative $\dot{F}$ of the cost function F to a sampling circuit 32 which holds the value of $\dot{F}$ as an input signal to a single control signal generator 10. The latter can have the analog form of FIGS. 1 and 2, or can be a digital computation device provided with a suitable algorithm to derive the values of $Y_i$. The output of the control signal generator 10 is provided to a demultiplexing circuit 34 having a suitable number of outputs to supply the needed control signal values $Y_1$ to $Y_n$ to the cost function generator 30. A clock generator 36 sequences the sampling circuit 32 the control signal generator 10 and the demultiplexer 34 so that the values of $Y_i$ are provided in sequence. A single VLSI circuit can be used to multiplex the many individual control signals. This type of multiplexed digital embodiment is readily achieved by standard, well-known techniques and would be within the scope and spirit of this invention.

While the invention has been described in detail with respect to preferred embodiments, it should be recognized that the invention is not limited to those embodiments. Rather, many modifications and variations would present themselves to those of skill in the art without departing from the scope and spirit of this invention, as defined in the appended claims.

What is claimed is:

1. A multiparameter control circuit for supplying a plurality of control signals to a physical multiple-input system whose performance is expressed by a cost function and which includes means providing a time derivative signal representing the time derivative of said cost function comprising a plurality of control signal generating circuits which respectively provide said control signals to said multiple input system, each said control signal being operative to control a respective system variable of said multiple input system, and automatically adjust their associated control signals to optimize said cost function, each said control signal generating circuit including:

a multiplier having a first input coupled to receive said time derivative signal, a second input, and an output;

an integrator having an input coupled to the output of said integrator, a second input, and an output which provides the associated control signal;

perturbation signal generator means providing an electrical perturbation to the second input of said adder;

a differentiator having an input connected to said adder and an output providing a time derivative of said associated control signal to the second input of the said multiplier; and means for providing said associated control signal to a respective control input of said multiple input system continuously during operation and for causing said associated control signals to adjust their respective system variables until the performance represented by said cost function is optimized.

2. The multiparameter control circuit of claim 1 in which said perturbation signal generator means includes at least one white noise generator.

3. The multiparameter control circuit of claim 2 in which each said control signal generating circuit includes a respective white noise generator coupled to said adder.

4. The multiparameter circuit of claim 1 in which each said electrical perturbation is a signal which changes rapidly with respect to the cost function.

5. The multiparameter circuit of claim 4 wherein said rapidly changing functions for the respective control signal generating circuits are mutually incoherent.

6. The multiparameter control circuit of claim 1 wherein said control signal generating circuits provide said respective control signals according to the relation:

$$Y_i(t) = Y_i(0) + g_i(t) + \gamma \int \dot{F}(t) \dot{Y}_i(t) dt$$

where:
$Y_i(t)$ is the associated control signal,
$Y_i(0)$ is the initial value of the control signal,
$g_i(t)$ is the perturbation,
$\gamma$ is a constant,
$\dot{F}(t)$ is the time derivative of the cost function F(t), and
$\dot{Y}_i(t)$ is the time derivative of the associated control signal $Y_i(t)$.

7. The multiparameter control circuit of claim 6 wherein said constant $\gamma$ is selected to be positive where the cost function F(t) is to be maximized and negative where the cost function F(t) is to be minimized.

8. A multiparameter control circuit for supplying a plurality of control signals to a physical multiple-input system whose performance is expressed by a cost function and which includes means providing a time rate of change of said cost function, said circuit comprising at least one control signal generating circuit which provides a succession of outputs as said control signals, the control signals being operative to control respective system variables of said multiple input system, and which automatically adjusts the respective control signals to optimize said cost function, said at least one control signal generating circuit comprising control signal differentiator means providing a time rate of change of said output control signal;

multiplier means providing a product of the time rate of change of said output control signal and the time rate of change of said cost function;

integrator means receiving said product from said multiplier means and providing a time integral signal representing the time integral of said product;

perturbation signal generator means providing an incoherent perturbation;

adder means for adding said time integral and said incoherent perturbation and providing said control signals according to the relation:

$$Y_i(t) = Y_i(0) + g_i(t) + \gamma \int \dot{F}(t) \dot{Y}_i(t) dt$$

where

- $Y_i(t)$ is the ith control signal,
- $Y_i(0)$ is the initial value of the control signal,
- $g_i(t)$ is the ith perturbation,
- $\gamma$ is a constant,
- $F(t)$ is the time rate of change of the cost function $\dot{F}(t)$, and
- $\dot{Y}_i(t)$ is the rate of change of the ith control signal; and means for providing said control signals to respective control inputs of said physical multiple-input system continuously during operation and for causing said control signals to adjust their respective system variables until the performance represented by said cost function is optimized.

9. A multiparameter control circuit for supplying a plurality of control signals $Y_i(t)$ to a physical multiple input system whose performance is expressed by a cost function $F(t)$, each said control signal being operative to control a respective system variable of said multiple input system, and which control circuit includes means providing a time rate of change $\dot{F}(t)$ of said cost function, said circuit comprising a control signal generating circuit which is supplied with said time rate of change $\dot{F}(t)$ for a calculation cycle, and supplying the same to said control signal generating circuit; a demultiplexer having an input coupled to an output of the control signal generating circuit and a plurality of outputs providing respective values of the control signals $Y_i(t)$ to inputs of the multiple input system, said control signal generating circuit providing said control signals $Y_i(t)$ according to the relation:

$$Y_i(t) = Y_i(0) + g_i(t) + \gamma \int \dot{F}(t) \dot{Y}_i(t) dt$$

where

- $Y_i(0)$ is the initial value of the ith control signal,
- $g_i(t)$ is an incoherent perturbation,
- $\gamma$ is a constant, and
- $\dot{Y}_i(t)$ is the time rate of change of the ith control signal $Y_i(t)$; and means for providing said control signals $Y_i(t)$ to respective control inputs of said physical multiple input system continuously during operation and for causing said control signals to adjust their respective system variables until the performance expressed by said cost function is optimized.

* * * * *

UNITED STATES PATENT AND TRADEMARK OFFICE
CERTIFICATE OF CORRECTION

PATENT NO. : 4,912,624
DATED : March 27, 1990
INVENTOR(S) : Erich Harth et al.

It is certified that error appears in the above—identified patent and that said Letters Patent is hereby corrected as shown below:

Col. 7, line 7, "F(t)" should read --$\dot{F}(t)$--;

line 8, "F(t)" should read --$\dot{F}(t)$--.

Signed and Sealed this

Twelfth Day of May, 1992

*Attest:*

DOUGLAS B. COMER

*Attesting Officer*   Acting Commissioner of Patents and Trademarks

UNITED STATES PATENT AND TRADEMARK OFFICE
CERTIFICATE OF CORRECTION

PATENT NO. : 4,912,624
DATED : March 30, 1990
INVENTOR(S) : Erich Harth et al.

It is certified that error appears in the above—identified patent and that said Letters Patent is hereby corrected as shown below:

Col. 5, between lines 63 and 64, please insert:

--an adder having a first input coupled to the output of said integrator, a second input, and an output which provides the associated control signal;--

Signed and Sealed this

Seventh Day of December, 1993

Attest:

BRUCE LEHMAN

*Attesting Officer*   *Commissioner of Patents and Trademarks*